(12) United States Patent
Ichimura et al.

(10) Patent No.: US 7,344,164 B2
(45) Date of Patent: Mar. 18, 2008

(54) PIPE CONNECTION STRUCTURE

(75) Inventors: Nobuo Ichimura, Gunma (JP);
Yoshikazu Takamatsu, Sano (JP);
Susumu Sato, Gunma (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 11/101,642

(22) Filed: Apr. 8, 2005

(65) Prior Publication Data
US 2005/0242575 A1 Nov. 3, 2005

(30) Foreign Application Priority Data
Apr. 9, 2004 (JP) .............................. 2004-115568

(51) Int. Cl.
*F16L 5/00* (2006.01)
(52) U.S. Cl. ...................... 285/203; 285/382; 285/205
(58) Field of Classification Search ................ 285/382, 285/205, 206, 207, 208, 203
See application file for complete search history.

(56) References Cited
U.S. PATENT DOCUMENTS 3,374,014 A * 3/1968 Kull et al. .................. 285/382
3,930,298 A * 1/1976 Ridenour .................. 285/382.5
5,596,881 A 1/1997 Wilson et al.
5,743,571 A * 4/1998 Gaitros et al. .............. 285/382
5,774,982 A 7/1998 Hutchison et al.
5,833,280 A * 11/1998 Ferlin et al. ............. 285/382.1
6,868,684 B2 * 3/2005 Law et al. .................... 62/225

FOREIGN PATENT DOCUMENTS

| CN | 1112225 A | 11/1995 |
| DE | 38 16 749 A1 | 11/1989 |
| EP | 0 672 874 A1 | 9/1995 |
| JP | 5-141580 A | 6/1993 |
| JP | 7-329549 A | 12/1995 |
| JP | 2591388 B2 | 12/1996 |

* cited by examiner

*Primary Examiner*—David Bochna
(74) *Attorney, Agent, or Firm*—Foley & Lardner LLP

(57) ABSTRACT

A pipe connection structure including a pipe having a pipe body, a end portion on a end side of the pipe body, and a collar extended radially outwardly from the end portion; and a block having a passage into which the end portion is inserted, a recess formed in an open end of the passage for receiving the collar, and a peripheral wall of the recess deformed inwardly and fitted onto the collar. The largest outside diameter portion of the collar is decentered toward a bottom surface of the recess.

6 Claims, 13 Drawing Sheets

PIPE CONNECTION STRUCTURE

CROSS REFERENCE TO RELATED APPLICATIONS AND INCORPORATION BY REFERENCE

This application is based upon and claims the benefit of priority from the prior Japanese Patent Applications No. 2004-115568, filed on Apr. 9, 2004; the entire contents of which are incorporated herein by reference.

BACKGROUND OF THE INVENTION

1. Field of the Invention

The present invention relates to a structure for connecting a pipe to a block.

2. Description of the Related Art

In the technical field of vehicle air-conditioning systems, pipes are connected to a compressor, condenser, liquid tank, expansion valve, evaporator, and so on. Japanese Patent No. 2591388 discloses a structure for connecting a pipe to a passage in a block-shaped expansion valve. Japanese Published Unexamined Patent Application No. H7-329549 discloses a structure for connecting a pipe to an opening in a block-shaped cap of a liquid tank. Japanese Published Unexamined Patent Application No, H5-141580 discloses a structure for connecting a pipe to a bore in a block-shaped connector.

SUMMARY OF THE INVENTION

The present invention relates to a pipe connection structure which increases stability of the connection.

A pipe connection structure according to an aspect of the present invention comprises a pipe and a block. The pipe comprises a pipe body; an end portions and a collar projecting radially outwardly from the end portion. The block comprises a passage into which the end portion of the pipe is inserted; a recess formed in an open end of the passage for receiving the collar of the pipe; and a peripheral wall of the recess deformed inwardly and fitted onto the collar, The largest outside diameter portion of the collar is decentered toward a bottom surface of the recess.

BRIEF DESCRIPTION OF THE DRAWINGS

FIG. 18A is a cross-sectional view before caulking; and FIG. 18B is a cross-sectional view during caulking.

DETAILED DESCRIPTION OF THE INVENTION

Hereinafter, embodiments of the present invention will be described with reference to the drawings.

First Embodiment

Figure 1:
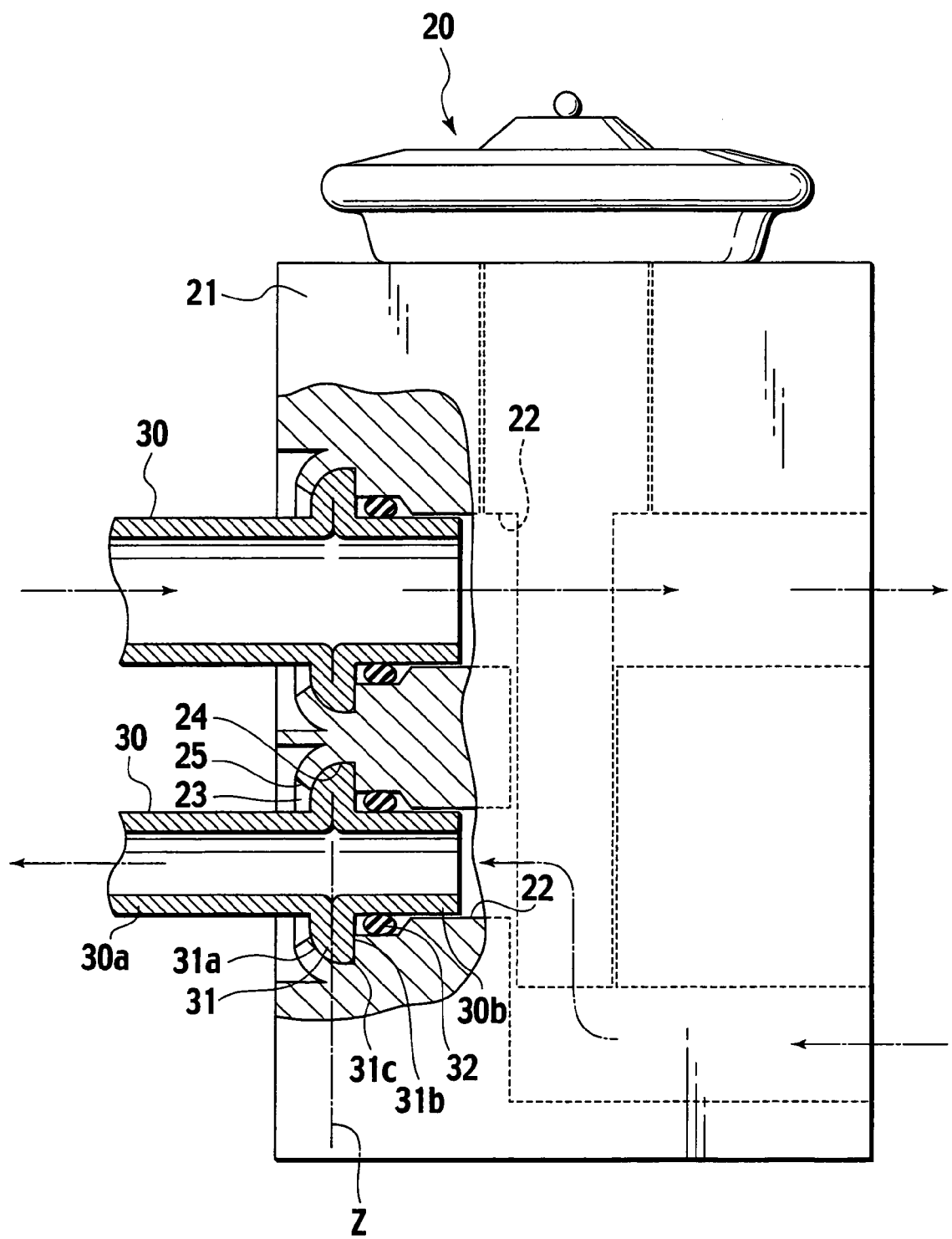
FIG. 1 is a side view of an expansion valve provided with a pipe connection structure according to a first embodiment of the present invention.
Figure 7:
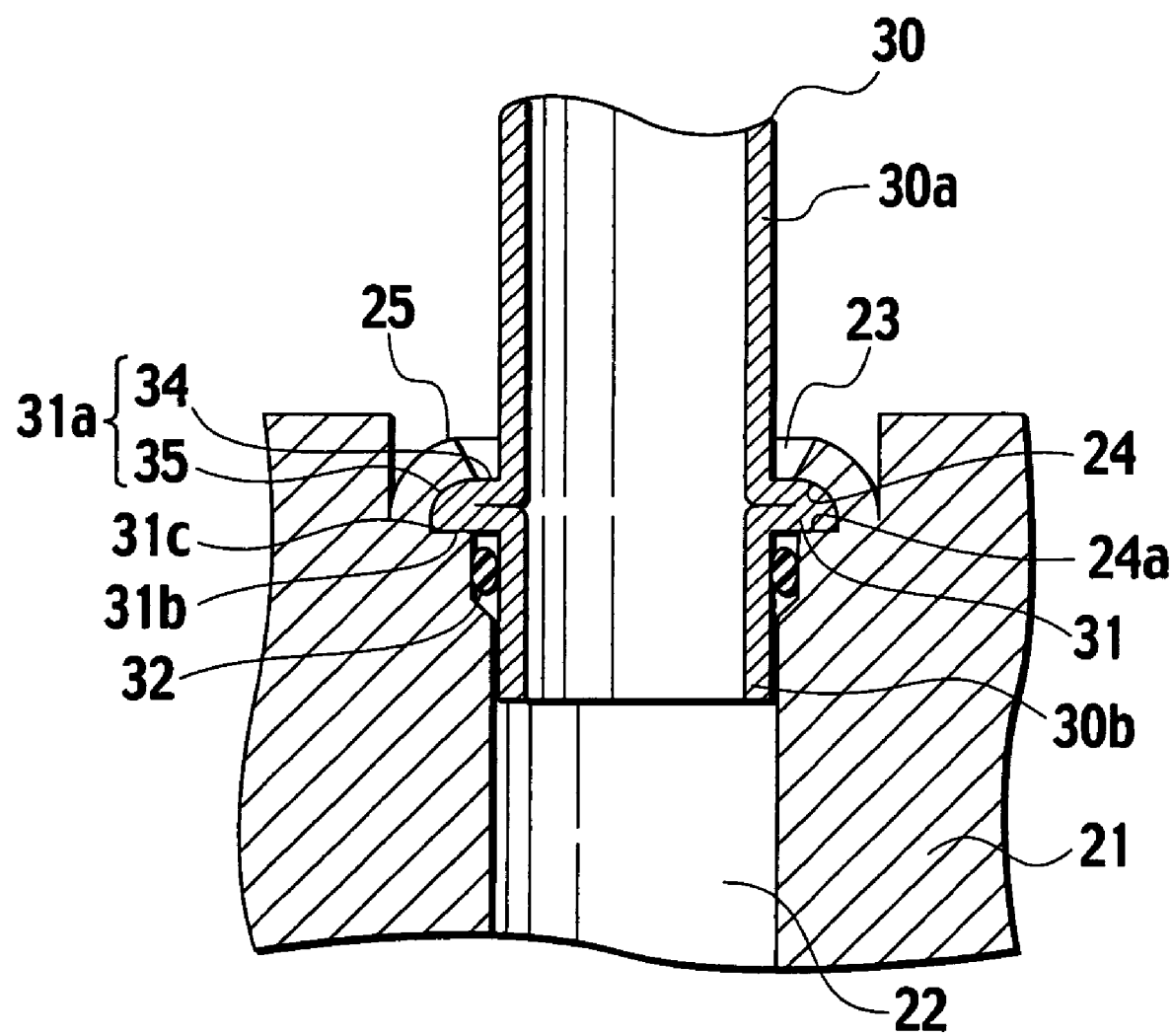
FIG. 7 is a diagram illustrating the pipe connection method in the first embodiment, a cross-sectional view of the pipe connected (connection structure)

FIG. 1 is a diagram illustrating an expansion valve to which a pipe connection structure of a first embodiment is applied. FIG. 7 is an enlarged cross-sectional view of the same pipe connection structure.

In the pipe connection structure in the first embodiment, a pipe 30, through which a refrigerant flows, is connected to a passage 22 formed in a block 21 of an expansion valve 20 as shown in FIGS. 1 and 7.

Figure 2:
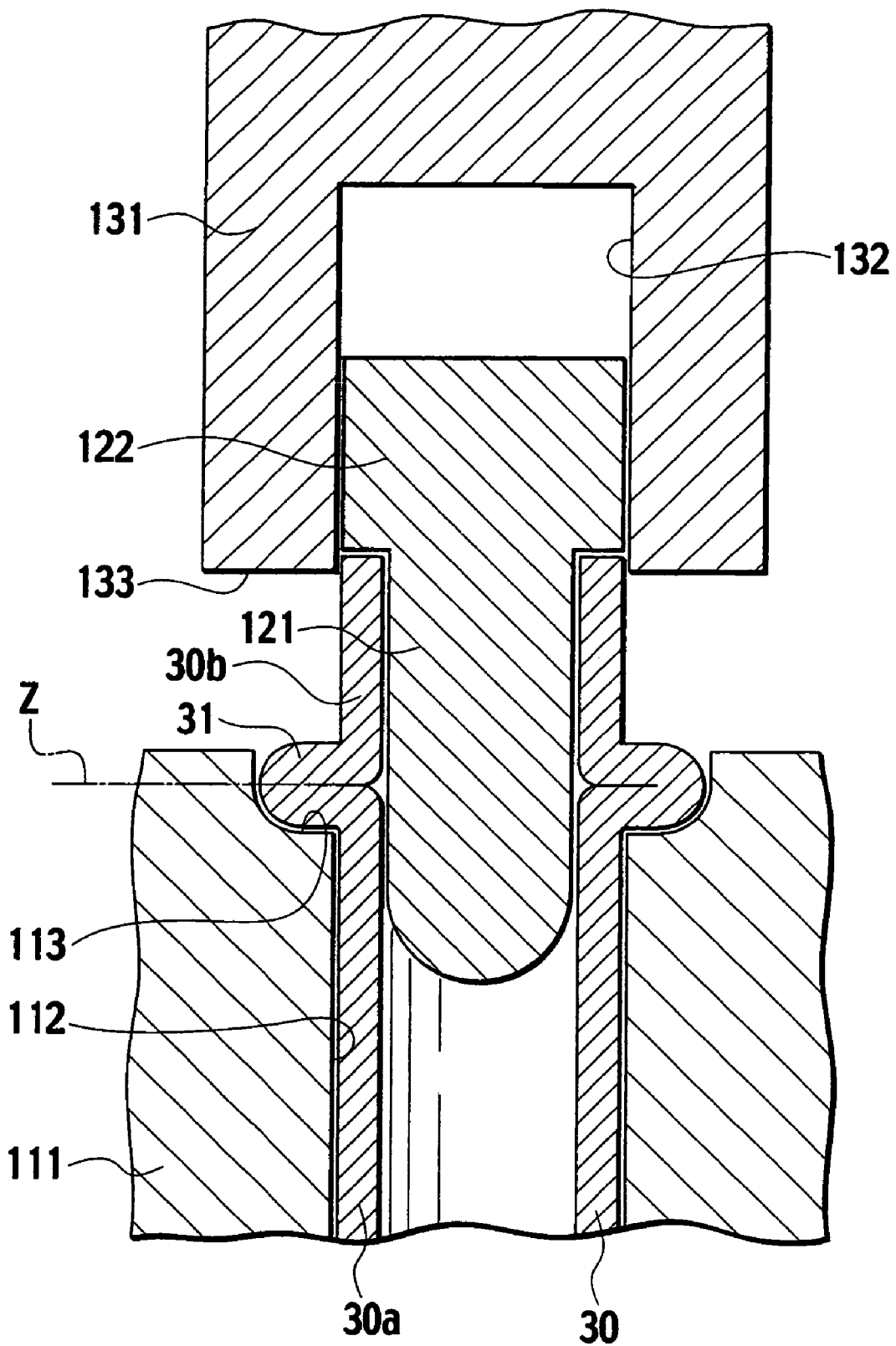
FIG. 2 is a diagram illustrating a pipe connection method in the first embodiment, a view immediately before a collar of a pipe is worked.

As shown in FIG. 2, the pipe 30 includes a circular cross-section pipe body 30a, an end portion 30b provided at an end of the pipe body 30a, and a collar (flange) 31 extended radially outwardly from the end portion 30b. As shown in FIG. 1, an O-ring 32 is fitted on the end portion 30b of the pipe 10.

The block 21 includes the passage 22 formed with substantially the same diameter as the end portion 30b of the pipe 30 inserted thereinto, a recess 24 formed in an open end 23 of the passage 22 for receiving the collar 31 of the pipe 30, and a peripheral wall 25 formed around the outer periphery of the recess 24 and deformed inwardly by a tool and fitted onto the collar 31. The passage 22 and the recess 24 are circular in cross-section. The recess 24 is formed with a larger diameter than the passage 22. The collar 31 is held between a bottom surface 24a of the recess 24 and the deformed peripheral wall 25 in the block 21, so that the pipe 30 is secured to the block 21.

The collar 31 of the pipe 30 is asymmetrical with respect to the thickness center line Z of the collar 31. In other words, the collar 31 of the pipe 30 does not have a symmetrical thickness with respect to the center line Z of the collar 31, unlike a pipe connection structure in a comparative example in FIGS. 18A and 18B.

Figure 4:
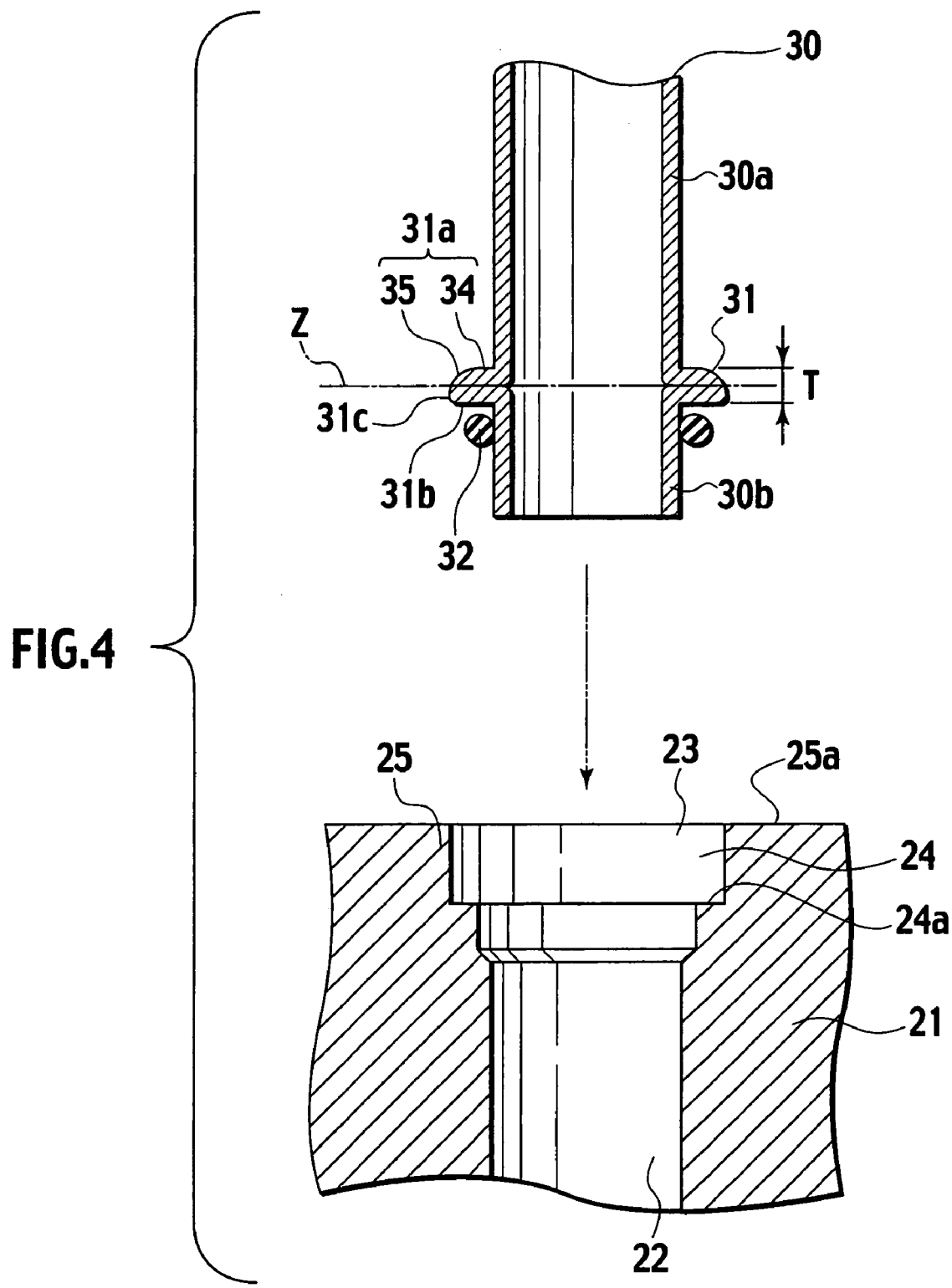
FIG. 4 is a diagram illustrating the pipe connection method in the first embodiment, a cross-sectional view of the pipe before connected.

More specifically, the largest outside diameter portion 31c of the collar 31 is located closer to the end of the pipe 30 than the thickness center line Z of the collar 31. In other words, the largest outside diameter portion 31c of the collar 31 is located closer to the bottom surface 24a of the recess 24 in the connection shown in FIGS. 5 through 7 than the thickness center line Z of the collar 31. Consequently, an upper surface 31a of the collar 31 (that is, a surface located closer to the pipe body 30a than the largest outside diameter portion 31c and located on the peripheral wall 25 in a connected state shown in FIGS. 5 through 7) is greater in area than a lower surface 31b of the collar 31 (that is, a surface located closer to the end portion 30b than the largest outside diameter portion 31c and located on the recess bottom surface 24a in the connection shown in FIGS. 5 through 7). As shown in FIG. 4, the upper surface 31a of the collar 31 includes a flat surface 34 and a smooth circular arc portion 35. The flat portion 34 is located around the inner periphery. The circular arc portion 35 extends from the flat portion to the largest outside diameter portion 31c. The radius of curvature of the circular arc portion 35 is greater than T/2, and is substantially equal to T in this embodiment. Reference T denotes the thickness of the collar 31.

Next, a process for achieving the above connection structure of the pipe 30 will be described.

Figure 3:
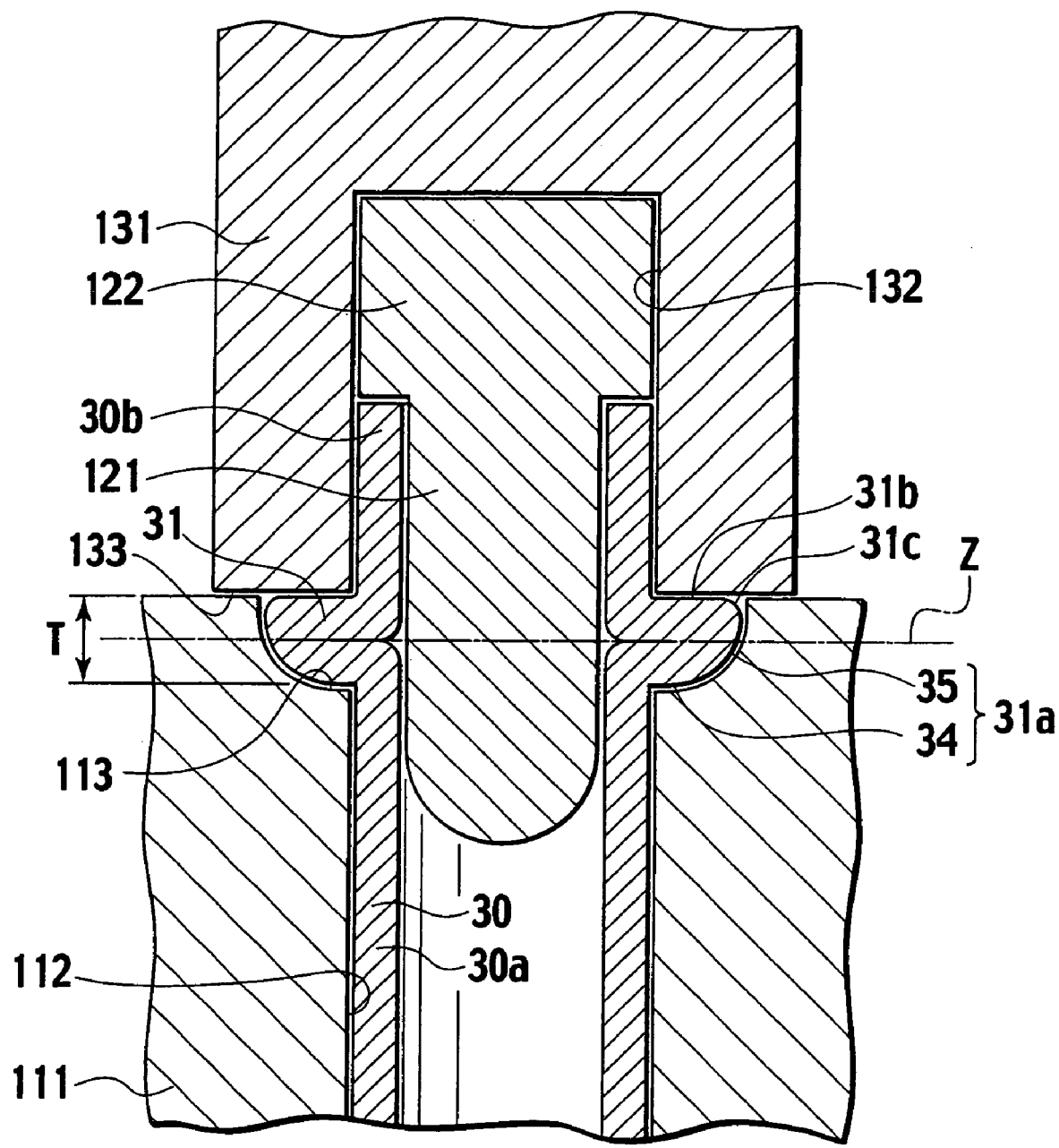
FIG. 3 is a diagram illustrating the pipe connection method in the first embodiment, a view after the collar of the pipe is worked.

Working of Pipe 30 (FIGS. 2 and 3)

First, the pipe 30 and the block 21 are formed in their respective predetermined shapes.

The working of the pipe 30 includes a plurality of steps, through which the collar 31 is formed on the end portion 30b of the pipe 30 in a conventional manner (e.g., see FIGS. 10 through 13 in Japanese Published Unexamined Patent Application No. H5-141580). The collar 31 is symmetrical with respect to the thickness center line Z. Then, the collar 31 is formed asymmetrically with respect to the thickness center line Z as shown in FIG. 3. Specifically, first, as shown in FIG. 2, the pipe 30 is held by a clamp 111. The clamp 111 is formed with a retention bore 112. In an open end of the retention bore 112, an expanded diameter portion 113, larger in diameter than the retention bore 112, is provided. The expanded diameter portion 113 is formed in a circular arc shape in cross section, Next, as shown in FIG. 2, a core bar 121 having an outside diameter equal to the inside diameter of the pipe 30 is fitted into the end portion of the pipe 30. The core bar 121 is provided at one end thereof with a large diameter portion 122, at which the core bar 121 is engaged with the end portion of the pipe 30. In this state, as shown in FIGS. 2 and 3, the end portion of the pipe 30, together with the core bar 121, is punched by the punch 131. The punch 131 is provided with an insertion bore 132 into which the core bar 121 and the end portion of the pipe 30 are inserted during punching. The insertion bore 132 has a diameter substantially equal to the outside diameter of the end portion 30b of the pipe 30. In the punching operation, the collar 31 is pressed between a distal end face 133 of the punch 131 and the expanded diameter portion 113 of the clamp 111, and is formed in a desired shape of the collar 31.

Then, as shown in FIG. 4, a sealing O-ring 32 is fitted on the end portion 30b of the pipe 30 to obtain a pipe 30 having the desired shape.

Working of Block (see FIG. 4)

The recess 24 is formed by cutting the inner sides of the passage 22 of the block 21. With this operation, a block with desired passage shape is obtained. The recess 24 is formed in the open end 23 of the passage 22, and is formed with a larger in diameter than the passage 22.

Pipe Connection

Figure 5:
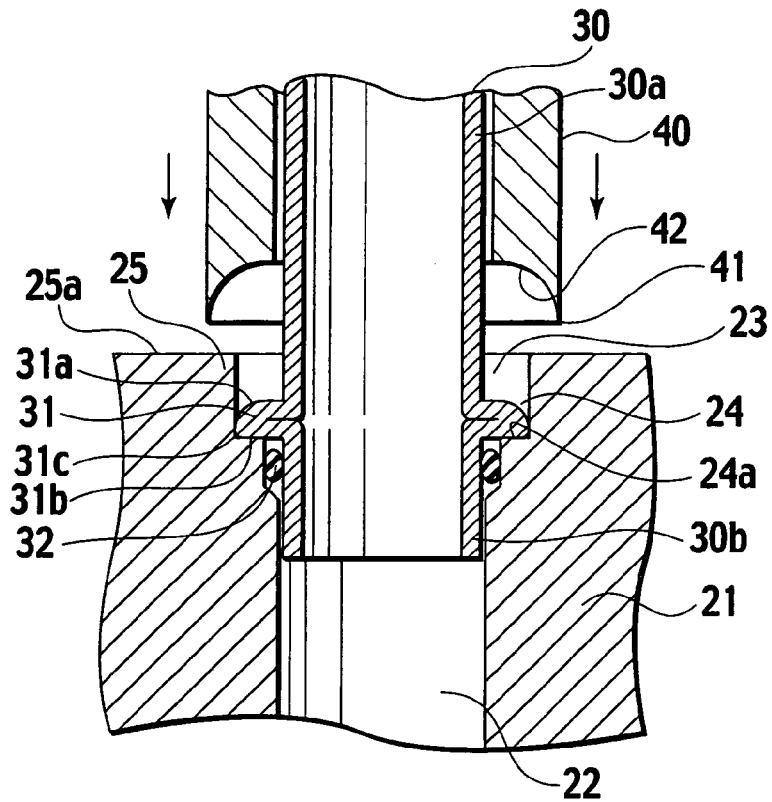
FIG. 5 is a diagram illustrating the pipe connection method in the first embodiment, a cross-sectional view of the pipe in the course of connection.

Next, the prepared pipe 30 is connected to the cut block 21. Specifically, as shown in FIG. 5, the end portion of the pipe 30 is inserted into the open end 23 of the passage 22 in the block 21. The O-ring 32, fitted on the periphery of the end portion of the pipe 30, is in pressing contact with the inner periphery of the passage 22, and the collar 31 of the pipe 30 is received in the recess 24. The inner peripheral surface of the recess 24 is in proximity to the largest outside diameter portion 31c. The collar 31 is located below an upper end face 25a of the peripheral wall 25 within the recess 24.

Figure 6:
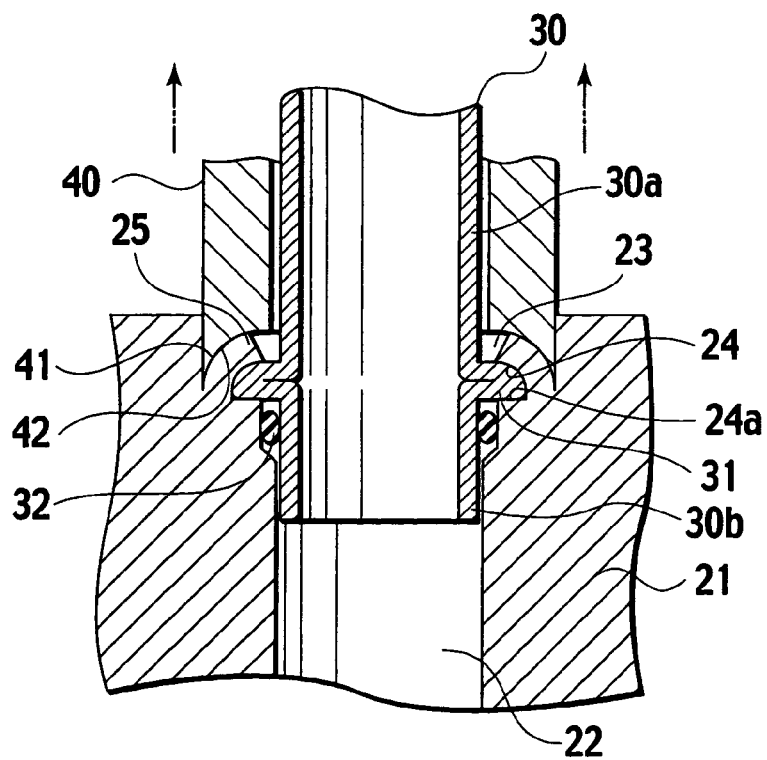
FIG. 6 is a diagram illustrating the pipe connection method in the first embodiment, a cross-sectional view of the pipe in the course of connection.

In this state, connection by a blade tool 40 is carried out as shown in FIG. 6. Specifically, an annular blade portion 41 is pressed into the upper end face 25a of the peripheral wall 25 of the recess 24. In this operation, the peripheral wall 25 is cut as a thin wall, and is bent and deformed inwardly to be press fitted onto the collar 31 so that the pipe 30 is connected to the block 21. As a result, the connection structure of the pipe 30 shown in FIG. 7 is achieved. The annular blade portion 41 includes, on the inner periphery thereof, an inclined surface 42 in a circular arc shape for inwardly bending and deforming the peripheral wall 25.

Results of the embodiment will be described.

First, since the largest outside diameter portion 31c of the collar 31 is decentered toward the bottom surface 24a of the recess 24, a portion of the lower surface 31b of the collar 31, which is not in contact with the bottom surface 24a of the recess 24, (corresponding to reference X in FIG. 18B) is reduced in area, and the upper surface 31a of the collar 31 is increased in area. Consequently, the contact area between the upper surface 31a of the collar 31 and the peripheral wall 25 is increased. Thus, the strength of the bonding force between the collar 31 and the deformed peripheral wall 25 is increased without increasing the respective sizes of the collar 31 and the peripheral wall 25. As a result, even when the recess 24 and the collar 31 cannot be increased in size due to space limitations, a substantial pressure-fixing strength can be provided to enable the stable fixing of the pipe 30.

Second, since the upper surface 31a of the collar 31 includes the smooth circular arc shaped portion 35 continuous to the largest outside diameter portion 31, the peripheral wall 25 is attached to the upper surface 31a more firmly than in the case of forming the upper surface 31a in a linear shape. Consequently, the strength of the bonding force between the collar 31 and the deformed peripheral wall 25 is further increased.

Third, since the peripheral wall 25 is cut in a thin wall shape from an outer periphery thereof while being bent and deformed inwardly by the blade tool 40 to press-fit the peripheral wall 25 onto the collar 31, it is not necessary to previously cut out a cylindrical portion (corresponding to reference 51 in FIG. 14) by a cutting tool, such as an end mill, (corresponding to reference 16 in FIG. 13) around the periphery of the recess 24. This eliminates a large volume of cutting by an end mill, and reduces the manufacturing cost.

Figure 13:
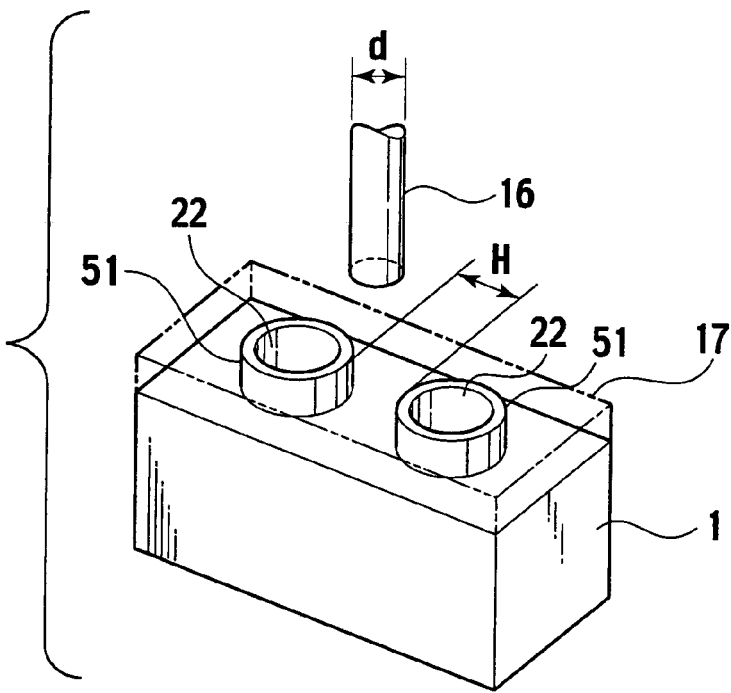
FIG. 13 is a diagram illustrating a pipe connection method according to a third embodiment of the present invention, a perspective view of a block formed with cylindrical portions.

When the end mill (corresponding to reference 16 in FIG. 13) is not necessary, layout is not restricted by the diameter of the end mill (corresponding to reference d in FIG. 13). That is, as in a modification shown in FIG. 11, a distance H1 between two recesses 24 only needs to be at least large enough to be cut into two peripheral walls 25 (about twice the thickness of the peripheral walls 25). Thus, the clearance between the two passages 22 in the block 21 can be reduced. This achieves a reduction in size of the block 21. In this invention, the two recesses 24 may alternatively be overlapped with each other so as to further reduce the distance between the passages 22. In this case, a blade tool may have a blade portion 41A with a interval at a position corresponding to the overlapped area, and the overlapped area is not caulked.

Example of Blade Tool

Figure 8:
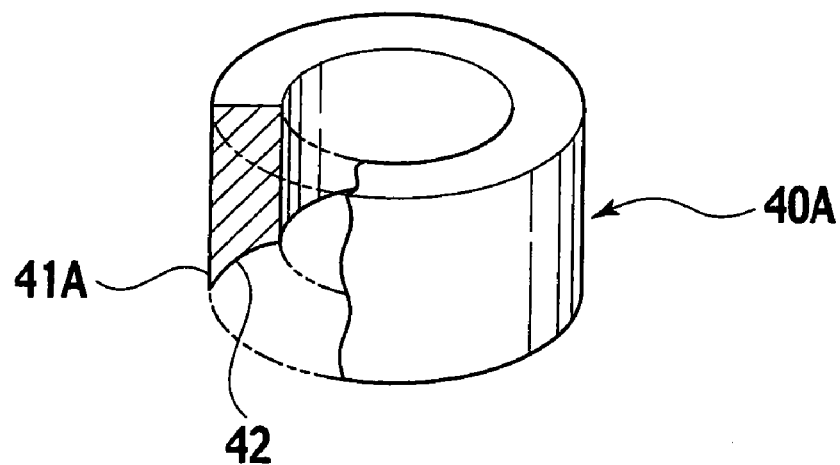
FIG. 8 is a partially cross-sectional perspective view of a blade tool used in the pipe connection method in the first embodiment.

FIGS. 8 and 10 illustrate an example of the blade tool 40 in the first embodiment.

Figure 9:
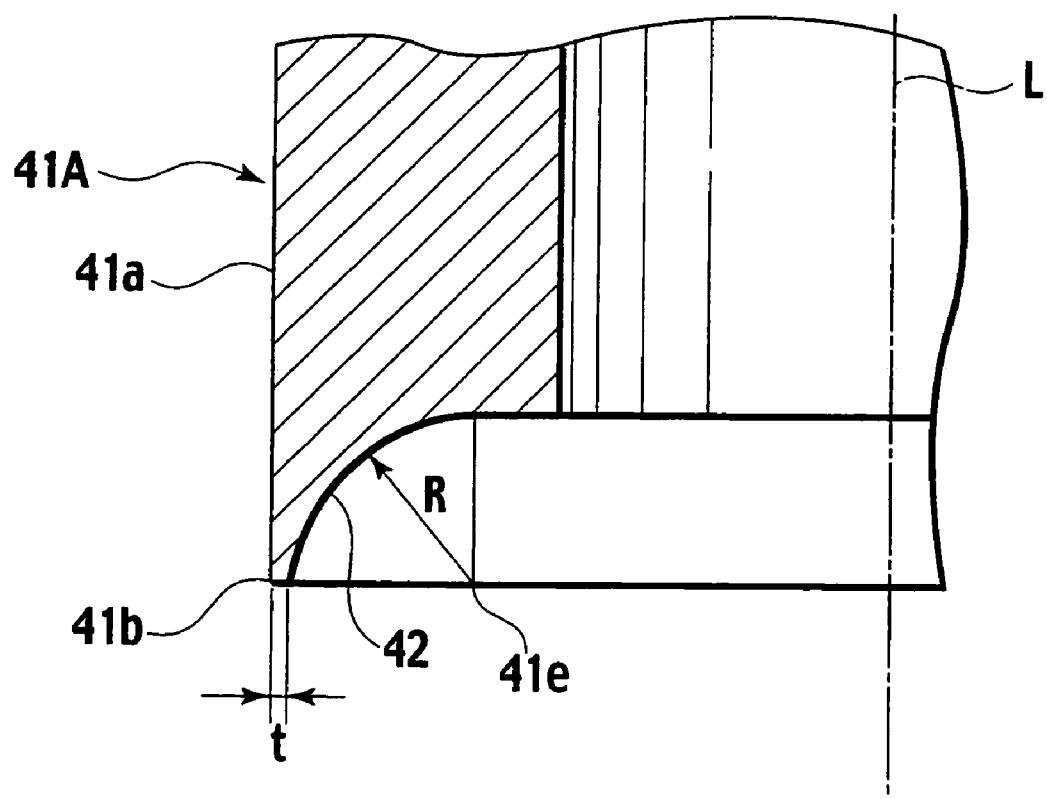
FIG. 9 is an enlarged cross-sectional view of the blade tool in FIG. 8.

A blade tool 40A in FIG. 8 includes a circumferentially continuous annular blade portion 41A. As shown in FIG. 9, the blade portion 41A includes an outer peripheral cylindrical surface 41a parallel to the central axis L of the cylindrical body. The blade portion 41A has a blade edge 41b with a small thickness t continuous to the distal end of the peripheral cylindrical surface 41a. The blade portion 41A has an inclined surface 42 continuous to the inner periphery of the blade edge 41b. The inclined surface 42 is curved in a concave shape with a predetermined curvature R. This allows the peripheral wall 25 to securely fasten the collar 31. The center of curvature 41e is located at the same height as that of the cutting edge 41b.

In the present invention, the inclined surface 42 may alternatively be either linear or curved in a convex shape. However, it is preferable that the inclined surface 42 be curved in a concave circular arc shape as shown in FIGS. 8 and 10.

Figure 10A:
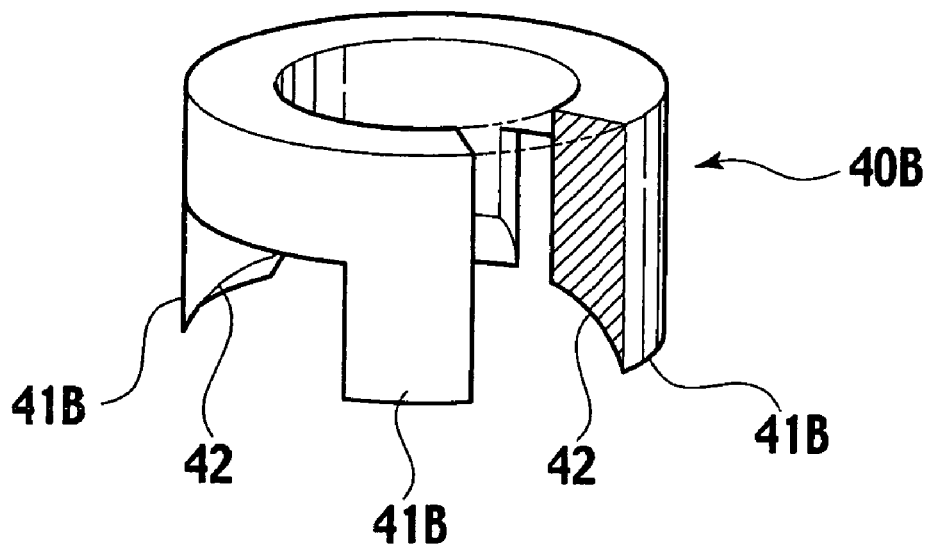
FIG. 10A is a partially cross-sectional perspective view of a blade tool in a modification.
Figure 10B:
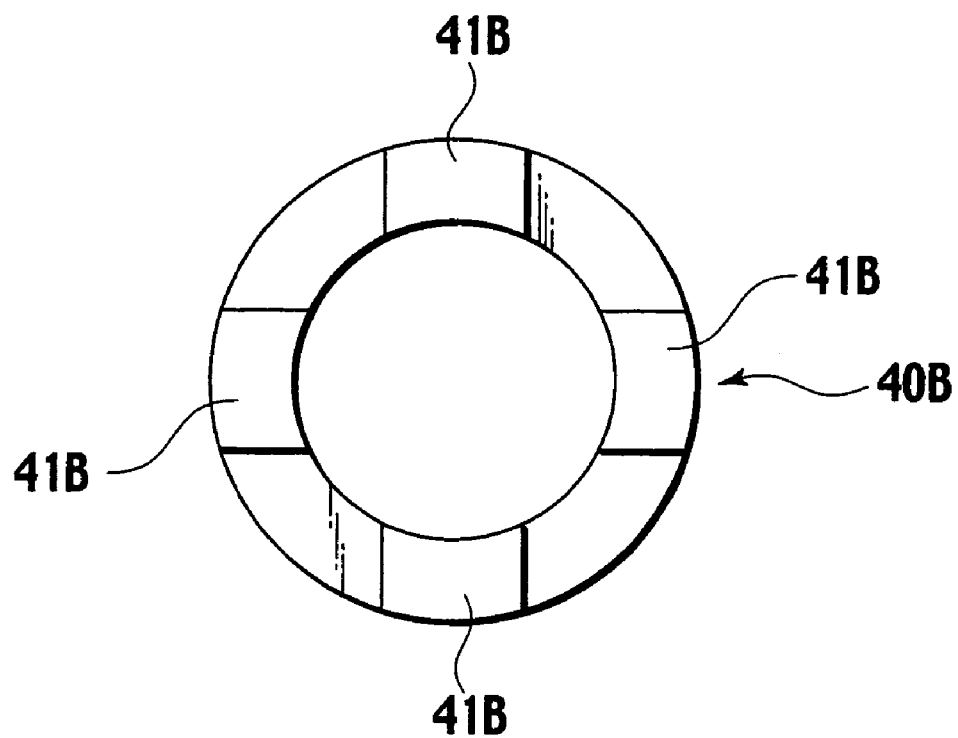
FIG. 10B is a bottom view thereof.
Figure 11:
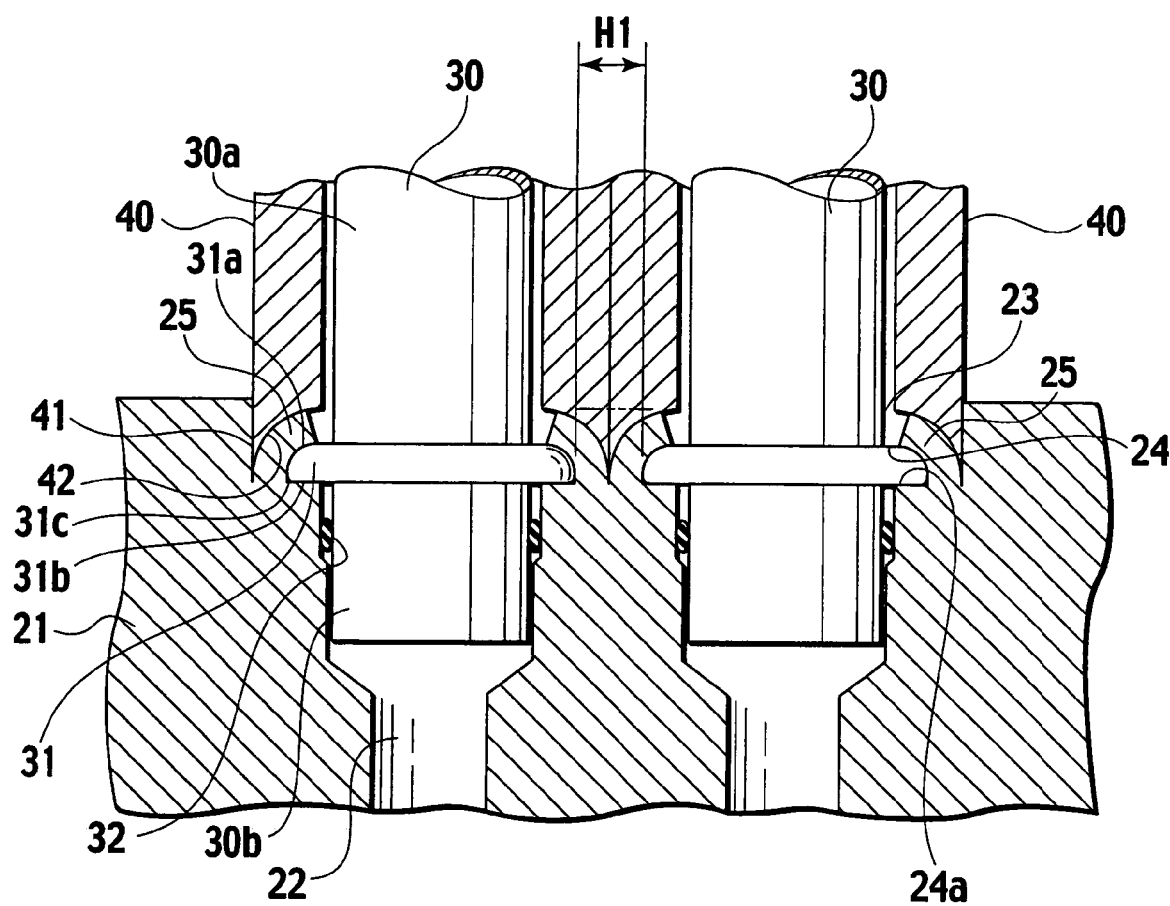
FIG. 11 is a cross-sectional view of a pipe connection structure in a modification of the first embodiment.

FIG. 10 illustrates another example of the blade tool 40. A blade tool 40B in FIG. 10A and 10B has a plurality of blade portions 41B arranged at equal intervals in a circumferential direction. It is preferable to set the number of blade portions 41B to any number that allows arrangement of the blade portions at equal interval along the circumferential direction, but the number is not limited to a specific number. A section of each blade portion 41B is similar to that shown in FIG. 9. When caulking is performed with the blade tool 40A in FIG. 8, the peripheral wall 25 of the recess 24 can be cut in an continuously annular thin cylindrical shape, and the entire periphery of the collar 31 can be firmly caulked. On the other hand, when caulking is performed with the blade tool 40B in FIG. 10, there is an advantage that the peripheral wall 25 of the recess 24 is cut in a thin cylindrical wall by the intermittently arranged blade portion 41B, and the collar 31 can be easily caulked by a small force.

Second Embodiment

Figure 12:
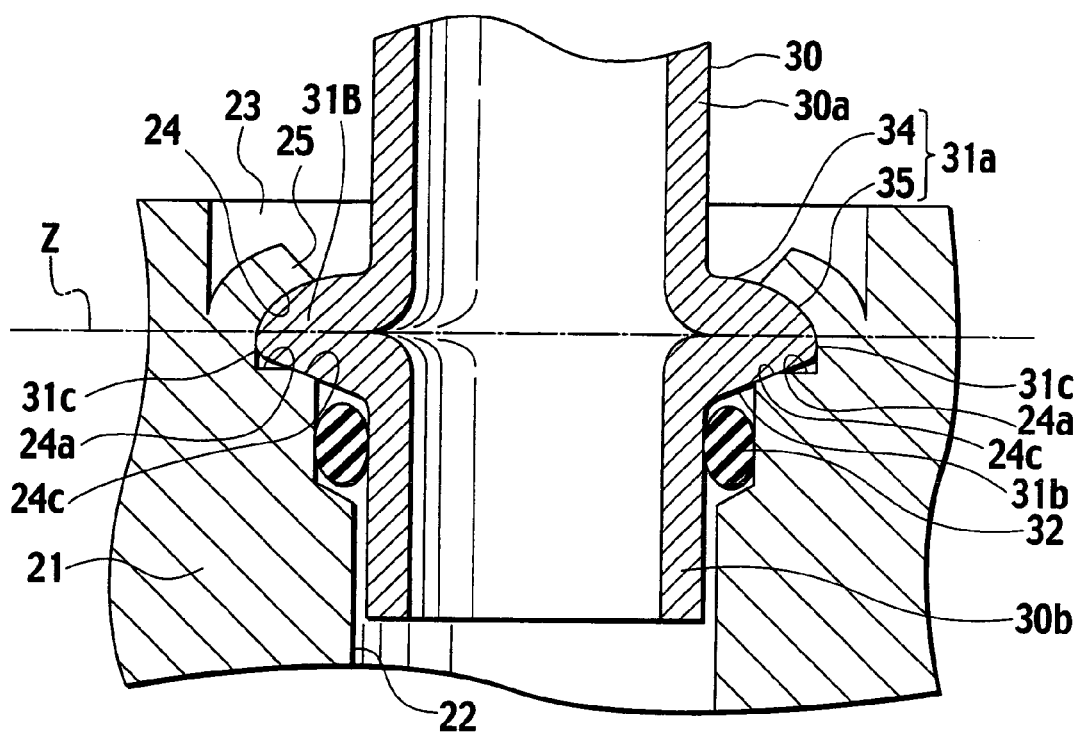
FIG. 12 is a cross-sectional view of a pipe connection structure according to a second embodiment of the present invention.

FIG. 12 illustrates a connection structure for a pipe 30 in a second embodiment. Components identical to those in the first embodiment are given the same reference numerals in the embodiment below, and their configurations, functions and effects will not be described.

The second embodiment is the same as the first embodiment in that the largest outside diameter portion 31c of a collar 31B is decentered toward a bottom surface 24a of a recess 24 as in the first embodiment. However, the collar 31B is different in shape from the collar 31 in the first embodiment. Specifically, in the second embodiment, a lower surface 31b of the collar 31B is expanded from the distal end side to the proximal end side of the pipe 30 in a tapered shape. The bottom surface 24a of the recess 24 is provided with a tapered portion 24c on which the tapered lower surface 31b of the collar 31B abuts.

The second embodiment provides the same functions and effects as the first embodiment.

In addition to the functions and effects of the first embodiment, the second embodiment achieves a further result that the tapered portion 24c facilitates the alignment of the central axis of the pipe 30 with the central axis of a passage 22.

Third Embodiment

In a third embodiment, as shown in FIG. 13, in a block working step, a portion 17 in an end face of a block 1 is removed by an end mill 16, leaving cylindrical portions 51. In the case of providing two cylindrical portions, the clearance H between the two adjacent cylindrical portions 51 is set greater than the outside diameter d of the end mill 16 as shown in FIG. 13.

Figure 14:
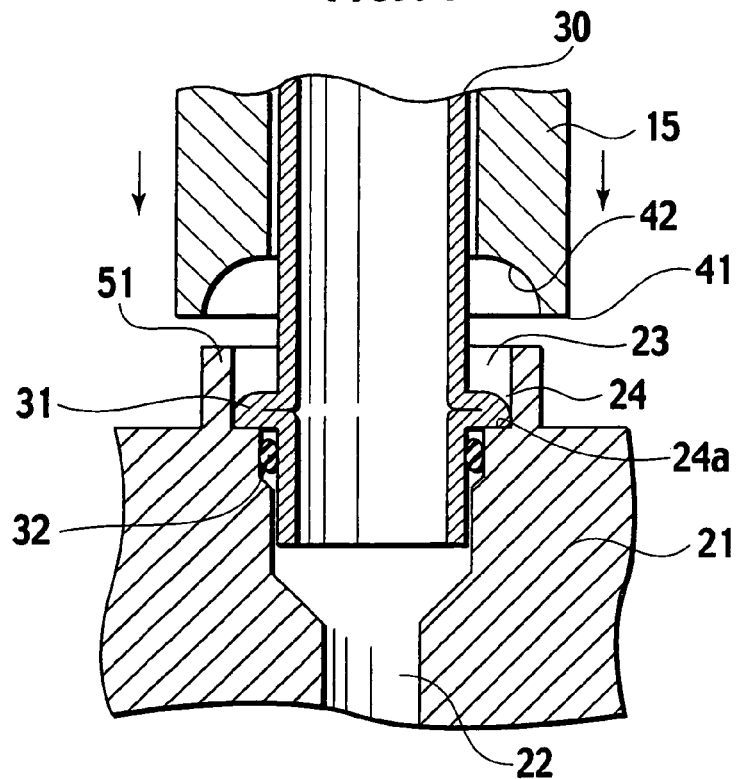
FIG. 14 is a diagram illustrating the pipe connection method in the third embodiment, a cross-sectional view before the cylindrical portion previously formed by cutting is bent and deformed by a punch.
Figure 15:
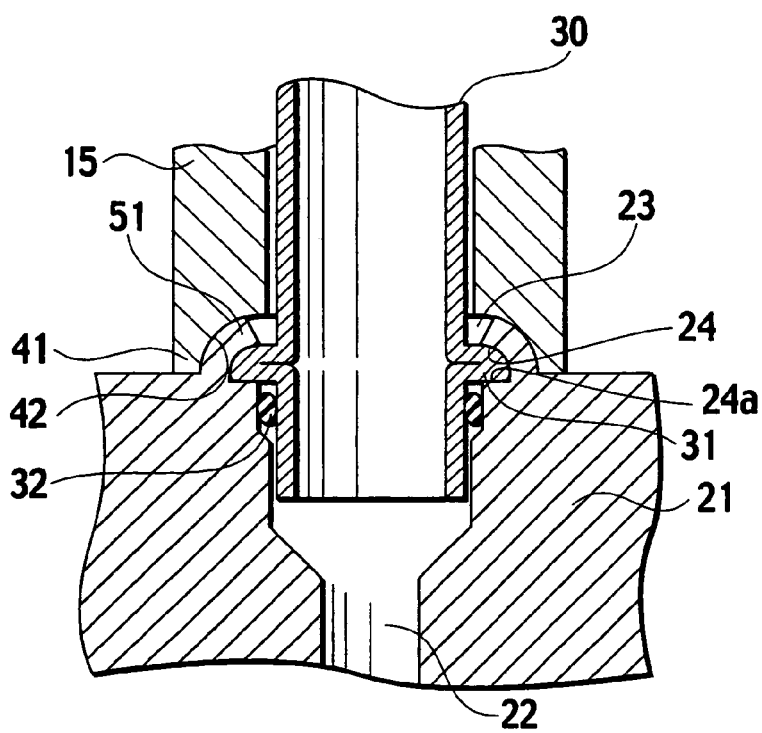
FIG. 15 is a diagram illustrating the pipe connection method in the third embodiment, a cross-sectional view when the cylindrical portion previously formed by cutting is being bent and deformed by the punch.
Figure 16:
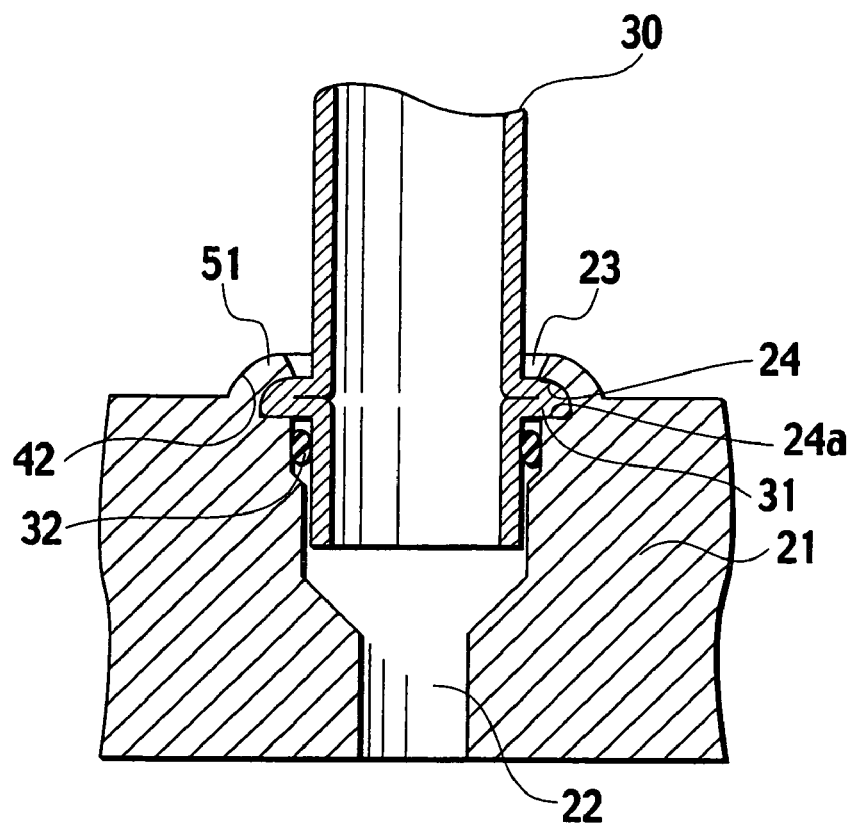
FIG. 16 is a diagram illustrating the pipe connection method (connection structure) in the third embodiment, a cross-sectional view after the cylindrical portion previously formed by cutting is bent and deformed by the punch.

In a pipe connection structure in the third embodiment, the cylindrical portions (peripheral walls) 51 are previously cut out by the end mill 16 around the peripheries of recesses 22 in the block 21 as shown in FIG. 13, and then, as shown in FIGS. 14, 15 and 16, each cylindrical portion 51 is bent and deformed inwardly by a punch 15 to be fitted onto a collar 31.

The pipe connection structure and connection method in the third embodiment also provide the same functions and effects as the first embodiment.

Fourth Embodiment

Figure 17:
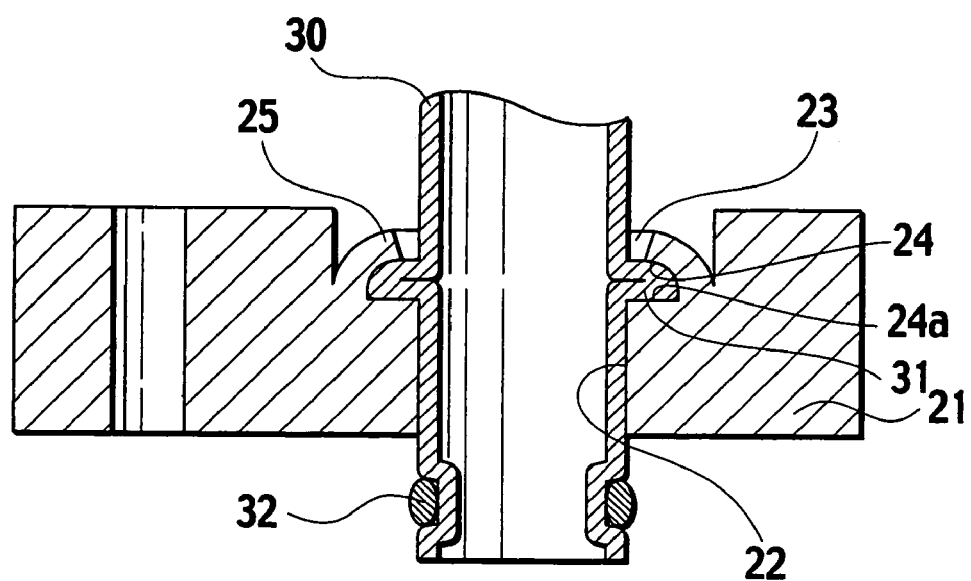
FIG. 17 is a cross-sectional view of a connection structure according to still another embodiment of the present invention.

In a pipe connection structure in a fourth embodiment, as shown in FIG. 17, a pipe 30 extends through a passage 22 in a block 21.

The fourth embodiment also provides the same advantages as the first and second embodiments.

COMPARATIVE EXAMPLE

The following comparative example is not included in the present invention.

Hereinafter, a pipe connection structure and connection method in this comparative example will be described.

Figure 18A:
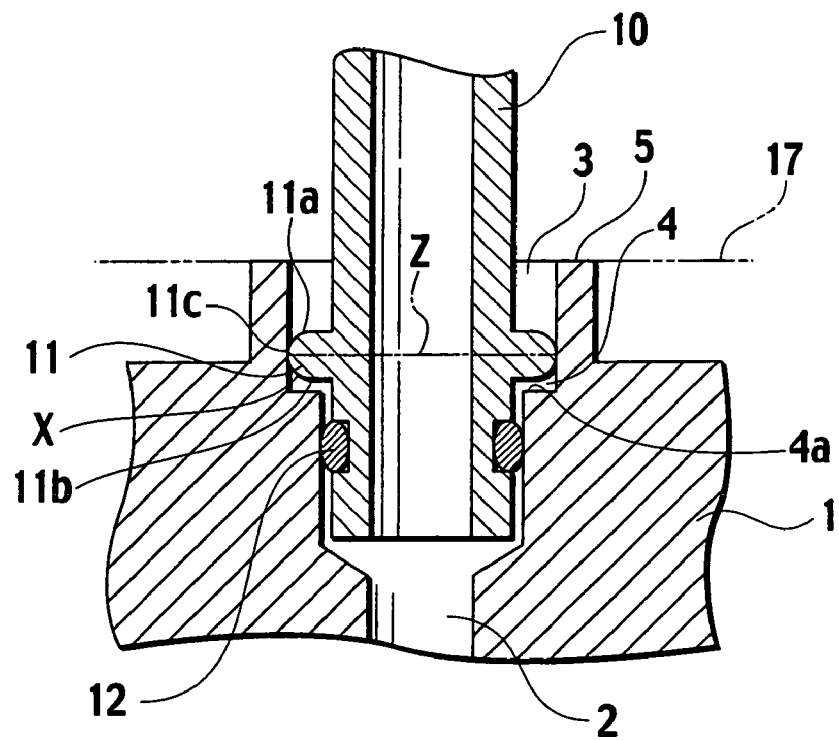
FIGS. 18A and 18B illustrate a pipe connection structure in a comparative example.
Figure 18B:
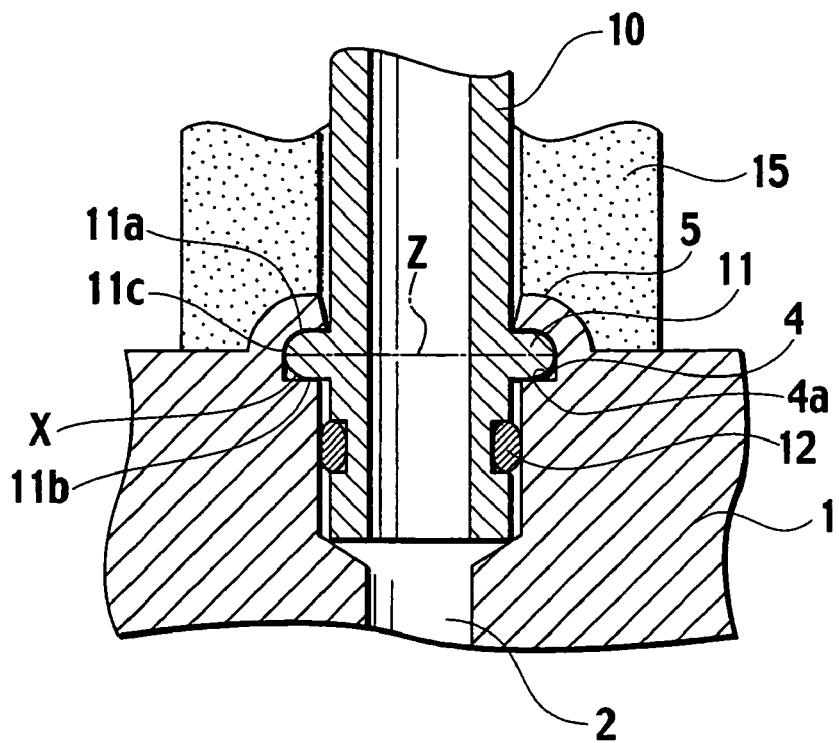

In FIGS. 18A and 18B, reference numeral 1 denotes a block; reference numeral 2, a passage formed in the block 1; reference numeral 3, an open end of the passage 2; reference numeral 4, a recess formed in the open end 3 of the passage 2 that is larger in diameter than the passage 2; reference numeral 5, a cylindrical portion provided around the periphery of the recess 4; reference numeral 10, a pipe; reference numeral 11, a collar formed on the periphery of the end portion of the pipe 10; and reference numeral 12, an O-ring fitted on the periphery of the pipe 10.

This comparative example is different from the first through fourth embodiments in that the largest outside diameter portion of the collar 11 is located in the thickness center line Z of the collar 11.

To connect the pipe 10 to the block 1, first, as shown in FIG. 18A, the pipe 10 is inserted into the open end 3 of the passage 2 in the block 1 to insert the collar 11 of the pipe 10 in the recess 4. Then, as shown in FIG. 18B, the cylindrical portion 5 is bent and deformed inwardly by a punch 15 to fit the cylindrical portion 5 onto the collar 11.

In this comparative example, since the largest outside diameter portion of the collar 11 is located in the thickness center line Z of the collar 11, a portion X of a lower surface of the collar 11, not contacting a bottom surface 4a of the recess 4, is larger in area than in the above-described first through fourth embodiments. The stability of the connection is therefore less than in the above-described first through fourth embodiments.

In contrast, according to the present invention, since the largest outside diameter portion of the collar is decentered toward the bottom surface of the recess, the portion of the lower surface of the collar, not contacting the bottom surface of the recess, has a reduced area, while the upper surface of the collar closely contacting the deformed peripheral wall has an increased area. With this structure, the strength of the pressure fixing of the collar by the deformed peripheral wall can be increased without increasing the size of the collar and the peripheral wall.

Although the invention has been described above by reference to certain embodiments of the invention, the invention is not limited to the embodiments described above. Modification and variation of the embodiments can be made without departing from the spirit or scope of the appended claims. Therefore, the embodiments are only for illustrative purpose and do not limit the invention.

What is claimed is:

1. A pipe connection structure, comprising:
   a pipe including a pipe body having first and second terminal ends, an end portion and a collar extending radially outwardly from the end portion, wherein the collar has an upper surface facing away from the second terminal end of the pipe body and located at a first distance from the first terminal end and a lower surface facing towards the second terminal end of the pipe body and located at a second distance from the second terminal end; and
   a block including a passage configured to receive the end portion of the pipe; a recess formed in an open end of the passage for receiving the collar of the pipe; and a peripheral wall of the recess configured to be deformed inwardly and fitted onto the collar;
   wherein the collar includes a circular-arc-shaped largest outside diameter portion located closer to a bottom surface of the recess than a thickness center line of the collar.

2. A pipe connection structure as set forth in claim 1, wherein:
   the lower surface is located closer to the bottom surface of the recess than the largest outside diameter portion; and the upper surface is located closer to the deformed peripheral wall than the largest outside diameter portion; and
   the upper surface includes a portion extending in a smooth circular arc shape from the largest outside diameter portion.

3. A pipe connection structure as set forth in claim 2, wherein the peripheral wall fitted onto the collar is a cylindrical portion projecting from the outer periphery of the recess and bent inwardly toward the recess.

4. A pipe connection structure as set forth in claim 2, wherein the peripheral wall fitted onto the collar is a thin-shaped peripheral wall of the recess that is defined by a groove formed at a distance from the recess.

5. A pipe connection structure as set forth in claim 1, wherein the peripheral wall fitted onto the collar is a cylindrical portion projecting from the outer periphery of the recess and bent inwardly toward the recess.

6. A pipe connection structure as set forth in claim 1, wherein the peripheral wall fitted onto the collar is a thin-shaped peripheral wall of the recess that is defined by a groove formed at a distance from the recess and bent inwardly toward the recess.

* * * * *